United States Patent [19]

Motoyama et al.

[11] 4,310,108

[45] Jan. 12, 1982

[54] AEROSOL SPRAYER WITH PRESSURE RESERVOIR

[75] Inventors: Shimesu Motoyama, Asaka; Shuri Yamada; Kaoru Kurita, both of Tokyo; Akira Iwasaki, Tanashi, all of Japan

[73] Assignee: Freund Industrial Co., Ltd., Tokyo, Japan

[21] Appl. No.: 176,448

[22] Filed: Aug. 8, 1980

Related U.S. Application Data

[63] Continuation of Ser. No. 913,923, Jun. 8, 1978, abandoned.

[51] Int. Cl.³ ............................................. B65D 83/00
[52] U.S. Cl. .................................. 222/396; 222/399; 137/505.25
[58] Field of Search .................. 137/505.25; 222/396, 222/399, 373; 239/303, 308, 373; 169/72, 73, 85

[56] References Cited

U.S. PATENT DOCUMENTS

| | | | |
|---|---|---|---|
| 2,659,629 | 11/1953 | Graham | 222/399 X |
| 2,694,602 | 11/1954 | Tomasek | 239/373 X |
| 2,976,897 | 3/1961 | Beckworth | 222/399 X |
| 3,074,426 | 1/1963 | Billington | 137/505.25 |
| 3,199,746 | 8/1965 | Dives et al. | 222/396 |
| 3,239,101 | 3/1966 | Wilson | 222/399 X |
| 3,239,102 | 3/1966 | Heydon et al. | 222/399 X |
| 3,255,824 | 6/1966 | Rodgers | 169/85 X |
| 3,325,053 | 6/1967 | De Boer et al. | 222/396 X |
| 3,403,820 | 10/1968 | Landis et al. | 222/396 |
| 3,632,045 | 1/1972 | Dana | 239/308 X |

FOREIGN PATENT DOCUMENTS 1399246 4/1965 France ............................ 239/308

*Primary Examiner*—David A. Scherbel
*Attorney, Agent, or Firm*—Fulbright & Jaworski

[57] ABSTRACT

An aerosol sprayer, which comprises a can for accommodating an aerosol material which is provided with a spray nozzle and connected with a pressure regulator, and a small-sized bomb which is charged with a highly compressed gas and connected with said pressure regulator.

4 Claims, 5 Drawing Figures

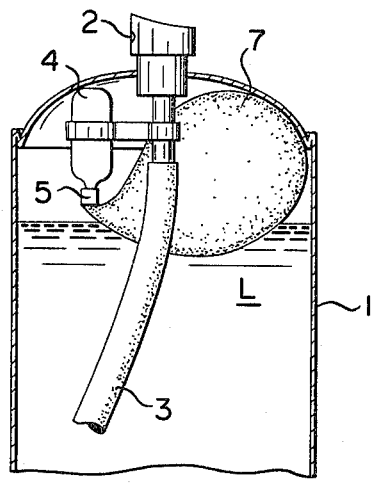
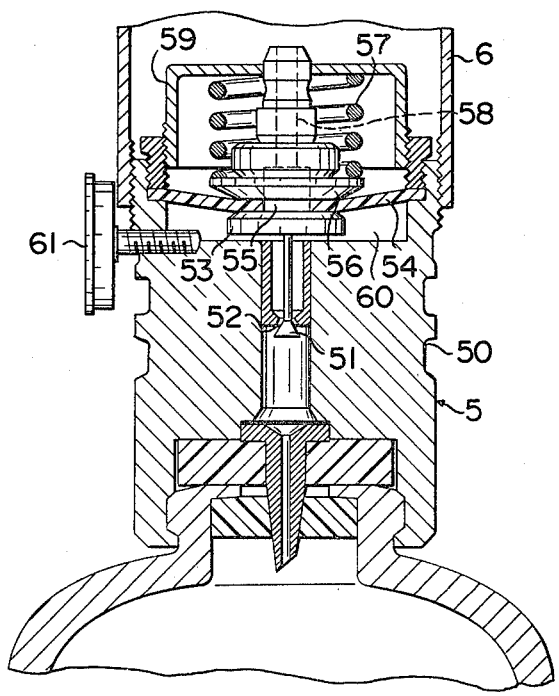

AEROSOL SPRAYER WITH PRESSURE RESERVOIR

This is a continuation of application Ser. No. 913,923 filed 6/8/78, now abandoned.

BACKGROUND OF THE INVENTION (a) Field of the Invention

The present invention relates to an aerosol sprayer for the purpose of applying liquid or powdery insecticides, liquid paints, liquid cosmetics, etc. by spraying.

(b) Description of the Prior Art

Conventional aerosol sprayers consist of a metallic can which is divided into a chamber for accommodating an aerosol material and a chamber for charging a propellant therein. In a sprayer of this type, the propellant chamber accounts for a major portion of the capacity of the can, while the aerosol chamber accounts for a minor portion of said capacity. Therefore, from the viewpoint of effective utilization of the capacity of an aerosol can, a sprayer of this type is not laudable.

Besides, as regards substances to serve as propellant for aerosol, liquefied petroleum gas and dimethyl ether are combustible and the use thereof involves a question of safety, while methylene chloride is toxic so that it would cause public nuisance when diffused into the air. As for freon and chlorofluorocarbon which were formerly said to be chemically stable and harmless to human body, it has recently been announced in the European and American medical world that these substances would be a main cause of skin cancer, conjunctivitis, etc, and accordingly, there is a strong tendency to ban the use thereof in all the countries of the world.

SUMMARY OF THE INVENTION

The present invention comprises a can for accommodating an aerosol material and a small-sized bomb which is equipped with a pressure regulator and is to be charged with a highly compressed gas. And, it is devised to charge a highly compressed gas harmless to human body in the bomb and spray the aerosol material contained in the can by liberating the gas pressure within the can.

BRIEF DESCRIPTION OF THE DRAWINGS

FIG. 4 is a partial cross-sectional view of an aerosol can, which illustrates the condition of a pressure regulator as installed within said can and equipped with a film bag.

FIG. 5 is an enlarged cross-sectional view of a pressure regulator.

DETAILED DESCRIPTION OF THE INVENTION

Figure 1:
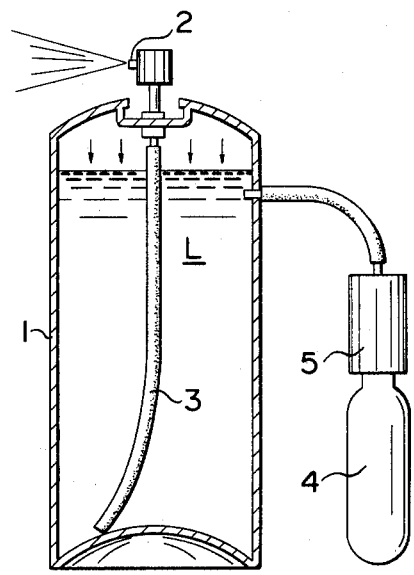
FIG. 1 is a cross-sectional view of an aerosol sprayer which comprises a pressure regulator and a compressed gas bomb as disposed outside an aerosol can.
Figure 3:
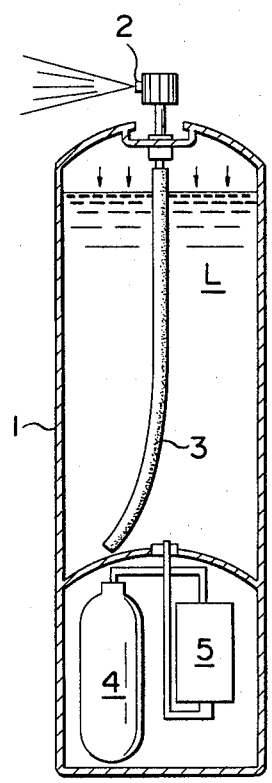
FIG. 3 is a cross-sectional view of an aerosol sprayer which comprises a pressure regulator and a compressed gas bomb as incorporated with an aerosol can and disposed at the bottom of said can.
Figure 2:
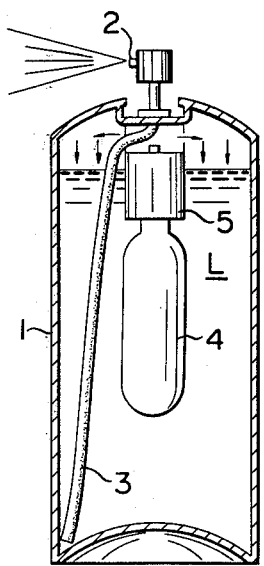
FIG. 2 is a cross-sectional view of an aerosol sprayer which comprises a pressure regulator and a compressed gas bomb as disposed inside an aerosol can.

In FIGS. 1 through 3, the reference numeral 1 denotes a can having a pressure resistance of about 10 $Kg/cm^2$ which is charged with an aerosol material L and is provided with a push bottom spraying nozzle 2 disposed on the top thereof. 3 denotes a hose connected with said spraying nozzle 2. 4 denotes a small-sized bomb which is charged with a highly compressed gas, and this bomb 4 is connected with the can 1 through a pressure regulator 5. In FIG. 1, the bomb 4 is disposed outside the can 1, and the bomb 4 and pressure regulator 5 are firmly fixed to the outer wall of the can 1 though not illustrated herein. In FIG. 2, the bomb 4 and pressure regulator 5 are installed in the upper part of the inside of the can 1, and in FIG. 3, they are installed at the bottom of the can 1, but both the bomb 4 and the pressure regulator 5 are of a small size and therefore the ratio of decrease in the capacity of the can 1 for the aerosol material is insignificant.

The bomb 4 is capable of being charged with a high pressure gas of about 200 $Kg/cm^2$, and as the applicable gas, some inert gasses harmless to human body like carbonic acid gas and nitrogen are ideal. In the case of employing carbonic acid gas, for instance, if a liquid contained in an aerosol can of 500 cc in capacity is to be sprayed under a pressure of 5 $Kg/cm^2$ and the final pressure is to be maintained at 5 $Kg/cm^2$, the capacity of the bomb will suffice to be about 6 cc. In the case where the charged aerosol material L is apt to dissolve carbonic acid gas or nitrogen, it will do to fix a gas bag 7 made of a film of plastic or rubber invulnerable to the aerosol material to the gas outlet of the pressure regulator 5 as illustrated in FIG. 4 and spray the aerosol material by applying pressure indirectly.

Direct liberation of the high pressure of the bomb 4 within the can 1 would not only cause difference in jet force of the aerosol material L according to the viscosity thereof, thereby making it difficult to handle the apparatus, but also involve a risk of elevating the internal pressure of the can 1 beyond an allowable pressure. Therefore, the present apparatus is so devised that a small-sized pressure regulator 5 is disposed at the gas outlet of the bomb 4 and the high-pressure gas is supposed to be supplied to the can 1 upon reducing its pressure to less than 10 $Kg/cm^2$ by means of said pressure regulator 5. The present invention has been achieved on the basis of accomplishment of such a small-sized pressure regulator as above.

FIG. 5 illustrates the internal structure of the pressure regulator 5. To be particular, a regulating valve 51 installed in the body 50 of the regulator always closes the gas outlet 52 by virtue of the high pressure within the bomb 4, and a valve-side based plate 53 connected to the valve 51 is disposed within a diaphragm chamber 60 and contacts with a diaphragm 54 fixed to the exterior of the body 50, thereby closing the hole 55 thereof. The outer side of the diaphragm 54 is in contact with another based plate 56 which works with the aid of a spring 57. A nut 59 is provided to adjust the force of the spring 57, and the based plate 56 is provided with a hole 58 for introducing the pressure of the bomb 4 therethrough.

When the force of the spring 57 is gradually strengthened by turning the adjusting nut 59 while consulting the pressure gauge 61, the based plate 56 thrusts the diaphragm 54 into the diaphragm chamber 60 with the aid of the spring 57. Inasmuch as the valve-side based plate 53 is in contact with the diaphragm 54 within the diaphragm chamber 60, the valve-side based plate 53 is also thrust, the valve 51 opens, and the high pressure within the bomb 4 is let into the diaphragm chamber 60. When the manipulation of the nut 59 is stopped upon attaining a desired air pressure, say, 2 Kg/cm², within the diaphragm chamber 60, said pressure is released to the outside, that is, into the can 1, through the hole 58. When the internal pressure of the can 1 becomes lower than 2 Kg/cm², the pressure within the diaphragm chamber 60 thrusts the diaphragm 54 in defiance of the force of the spring 57, and accordingly the diaphragm 54 separates from the valve-side based plate 53 and the pressure within the diaphragm chamber 60 is let into the can 1 through the hole 58. When the pressure within the diaphragm chamber 60 is thus decreased and becomes less than 2 Kg/cm², the spring 57 thrusts the based plate 56 again, the valve-side based plate 53 is thrust accordingly, and the valve 51 opens. In this way, the inside of the can 1 is constantly maintained at a prescribed pressure.

In the case of disposing the bomb 4 outside the can 1 as illustrated in FIG. 1, it suffices to connect an inlet pipe 6 with the body 50 of the pressure regulator 5 and introduce said inlet pipe 6 into the can 1.

It goes without saying that the foregoing description is no more than an explanation of the mechanism of an instance of applicable pressure regulators and the pressure regulator for use in the present invention is not limited to such one as described above. That is, in the present invention, introduction of the high pressure gas into the can 1 can be performed by means of a regulator wherein the secondary pressure is invariable, such as, for instance, a regulator employing a reducing valve set for 1 Kg/cm², 2 Kg/cm², etc. or other mechanisms for supplying a constant pressure.

Since the aerosol sprayer of the present invention is, as set forth above, devised to charge a harmless gas in a small-sized bomb at a high pressure and make it work with a constant pressure within a high-pressure can charged with a material-to-be-sprayed, it renders it possible not only to adjust the spraying pressure in proportion to the viscosity of the material-to-be-sprayed, but also to stuff the can for accommodating the material-to-be-charged with said material almost to the full extent of its capacity, thereby permitting the size of the can to be reduced that much and providing an excellent device for safe and stable spraying which can be economically manufactured.

Further, since the present invention renders it possible to charge the aerosol can 1 with the material-to-be-sprayed to the full extent of its capacity, it has an additional merit that the content of the can can be exactly indicated.

We claim:

1. An aerosol sprayer which comprises an aerosol can having a spray nozzle equipped on one end thereof, a pressure regulator connected with said can for providing a constant pressure in said can, and a compressed gas bomb which is connected with said regulator and charged with a highly compressed inert gas, said bomb being smaller in volume than said can and capable of holding greater pressures than said can, said regulator including a valve having a valve element exposed on one side to the pressure in the bomb in a direction to close the valve, a chamber on a second side of the valve element, said chamber partially defined by a partition member, said partition member being spring-biased against said valve in a direction to open said valve element, said partition member exposed on the side opposite said chamber to the interior of the can, and a passageway between said secondary chamber and the interior of the can and, a second valve means in said chamber for opening and closing said passageway in response to pressure changes in the can.

2. An aerosol sprayer according to claim 1 wherein the pressure regulator maintains a portion of the highly compressed gas within the bomb at a pressure of less than 10 Kg/cm².

3. An apparatus sprayer according to claim 1 wherein the pressure regulator maintains a substantially constant pressure in said can of less than 10 Kg/cm².

4. The aerosol sprayer according to claim 3 wherein the highly compressed gas in the bomb has an initial pressure of greater than 10 Kg/cm².

* * * * *